United States Patent
Leyden et al.

(10) Patent No.: US 11,015,626 B2
(45) Date of Patent: May 25, 2021

(54) SUPPORT ASSEMBLY FOR DISPLAYING A PORTABLE ARTICLE

(71) Applicant: Se-Kure Controls, Inc., Franklin Park, IL (US)

(72) Inventors: Roger J. Leyden, Inverness, IL (US); Lazaro Fraiman, Skokie, IL (US); John Manser, Elgin, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 60 days.

(21) Appl. No.: 16/504,754

(22) Filed: Jul. 8, 2019

(65) Prior Publication Data

US 2020/0107653 A1   Apr. 9, 2020

Related U.S. Application Data

(60) Provisional application No. 62/742,543, filed on Oct. 8, 2018.

(51) Int. Cl.
| | |
|---|---|
| *F16B 2/12* | (2006.01) |
| *A47F 5/04* | (2006.01) |
| *F16M 11/04* | (2006.01) |
| *F16M 11/06* | (2006.01) |
| *F16B 2/02* | (2006.01) |

(52) U.S. Cl.
CPC .................. *F16B 2/12* (2013.01); *A47F 5/04* (2013.01); *F16B 2/02* (2013.01); *F16M 11/04* (2013.01); *F16M 11/041* (2013.01); *F16M 11/06* (2013.01)

(58) Field of Classification Search
CPC .. F16B 2/02; F16B 2/12; F16M 11/06; F16M 11/04; F16M 11/041; A47F 5/04

USPC ... 248/229.12, 229.22, 228.3, 230.3, 231.21, 248/231.1

See application file for complete search history.

(56) References Cited

U.S. PATENT DOCUMENTS

| | | | |
|---|---|---|---|
| 5,457,745 A | 10/1995 | Wang | |
| 7,272,984 B2 * | 9/2007 | Fan | B60R 11/02 248/231.61 |
| 7,913,963 B2 * | 3/2011 | Cheng | B60R 11/02 248/205.5 |
| 8,627,953 B1 * | 1/2014 | Yeo | H04B 1/3888 206/320 |
| 8,864,089 B2 * | 10/2014 | Hung | F16M 11/041 248/274.1 |
| 8,985,544 B1 | 3/2015 | Gulick, Jr. | |
| 9,039,785 B2 | 5/2015 | Gulick, Jr. | |

(Continued)

*Primary Examiner* — Eret C McNichols
(74) *Attorney, Agent, or Firm* — Wood, Phillips, Katz, Clark & Mortimer

(57) ABSTRACT

A support assembly having a frame to support a portable article in a display position. The frame has first and second frame parts movable one relative to the other to change a dimension of a receiving space for a part of the first portable article. The frame is configured so that: a) relative movement can be effected between the first and second frame parts between: i) a first relationship wherein the receiving space has a first receiving dimension; and ii) a second relationship wherein the receiving space has a second receiving dimension that is less than the first receiving dimension; and b) the first and second frame parts upon being changed from the first relationship into the second relationship are blocked from changing from the second relationship back into the first relationship.

21 Claims, 6 Drawing Sheets

(56) References Cited

U.S. PATENT DOCUMENTS

| | | |
|---|---|---|
| 9,117,351 B2 | 8/2015 | Gulick, Jr. et al. |
| 9,298,219 B2 | 3/2016 | Gulick, Jr. |
| 9,714,528 B2 | 7/2017 | Van Balen |
| 9,749,002 B1* | 8/2017 | Fan ................... H04B 1/3888 |
| 9,972,178 B2* | 5/2018 | Richardson ........ G06Q 30/0185 |
| 10,165,873 B2 | 1/2019 | Gulick, Jr. |
| 10,378,248 B1 | 8/2019 | Kelsch et al. |
| 10,620,667 B2* | 4/2020 | Janzen ................. F16B 1/0071 |
| 2008/0192410 A1* | 8/2008 | Kumar ................. G06F 1/1615 |
| | | 361/679.4 |
| 2010/0051771 A1* | 3/2010 | Huang .................. F16M 13/00 |
| | | 248/289.11 |
| 2010/0079285 A1* | 4/2010 | Fawcett ............... G08B 13/149 |
| | | 340/568.1 |
| 2011/0062299 A1* | 3/2011 | Tsai .................... F16M 11/041 |
| | | 248/231.41 |
| 2012/0312936 A1* | 12/2012 | Huang .................. F16M 13/00 |
| | | 248/122.1 |
| 2013/0277520 A1* | 10/2013 | Funk .................... G06F 1/1626 |
| | | 248/274.1 |
| 2013/0301216 A1* | 11/2013 | Trinh .................... A47F 7/0246 |
| | | 361/679.58 |
| 2014/0060218 A1* | 3/2014 | Bisesti ................. F16M 11/041 |
| | | 73/865.8 |
| 2014/0226298 A1* | 8/2014 | Palmer ................. H05K 5/0208 |
| | | 361/807 |
| 2014/0263931 A1* | 9/2014 | Chen ..................... F16M 13/00 |
| | | 248/576 |
| 2015/0313026 A1* | 10/2015 | Yu ........................ F16M 11/041 |
| | | 248/285.1 |
| 2016/0018051 A1* | 1/2016 | Lin ..................... F16M 11/2021 |
| | | 248/122.1 |
| 2016/0140816 A1 | 5/2016 | Gulick et al. |
| 2017/0009935 A1* | 1/2017 | Theis .................. F16M 13/022 |
| 2017/0188724 A1* | 7/2017 | Lin ..................... F16M 11/041 |
| 2019/0093394 A1 | 3/2019 | Gulick, Jr. et al. |
| 2019/0125104 A1 | 5/2019 | Gulick, Jr. et al. |

* cited by examiner

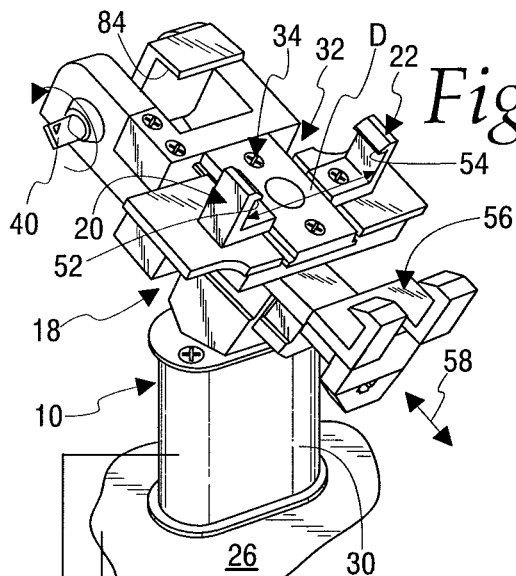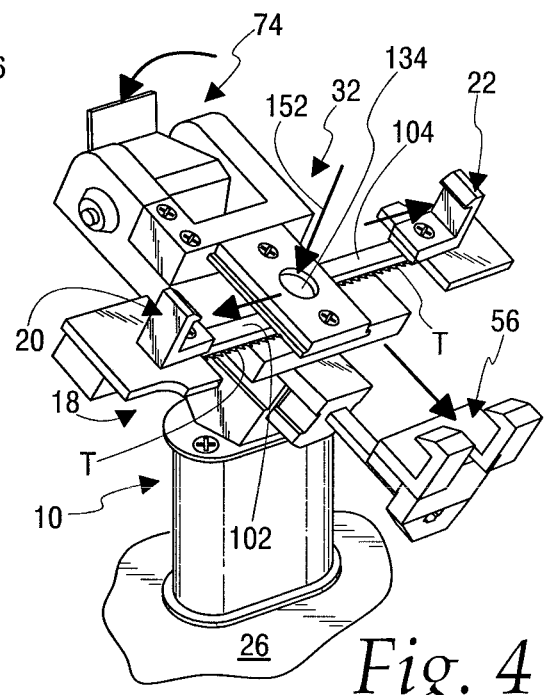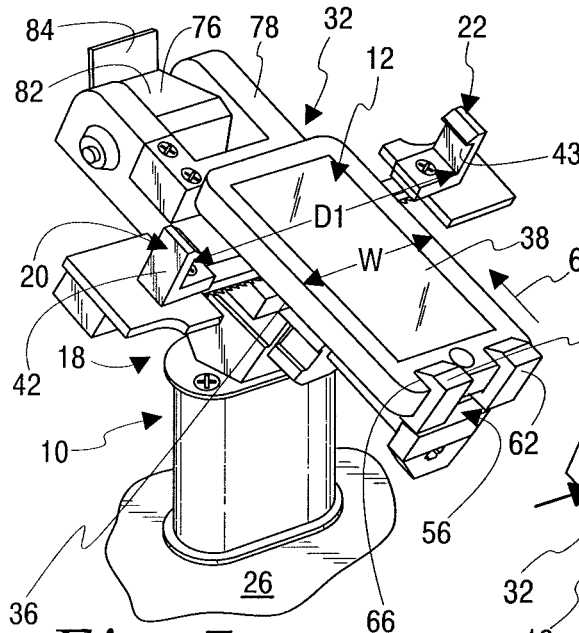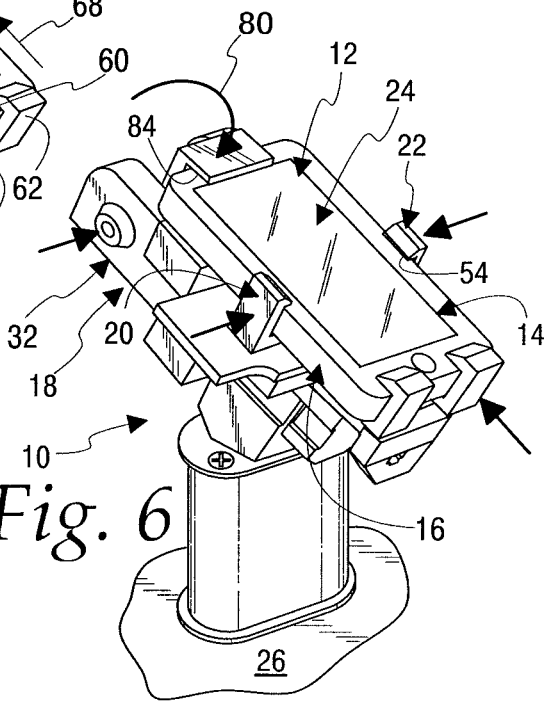

SUPPORT ASSEMBLY FOR DISPLAYING A PORTABLE ARTICLE

BACKGROUND OF THE INVENTION

Field of the Invention

This invention relates to supports for portable articles and, more particularly, to a support assembly that allows consumer inspection, and potential operation, of a portable article that is displayed upon the support assembly, and secured in a display position, as at point of purchase.

Background Art

Myriad portable electronic articles/devices are displayed in stores in a manner that allows consumers to test operation, identify features, etc. Because of the large number of choices available in most categories of electronic devices, the ability for a consumer to interact with these devices has become critical to successful sales efforts.

In most stores that offer portable electronic devices, different makes and styles of smart phones and tablets are commonly displayed in large numbers. Commonly, the smart phones/tablets are displayed on a pedestal-type support in a manner that the display regions thereon are substantially unobstructed. Since this type of article is, by its nature, relatively compact in size, and is in the high level expense category, loss due to theft at these displays is an industry problem.

Thus, those that design security systems for this category of device focus on systems that positively secure the devices and are resistant to tampering, yet allow relatively unimpeded viewing of displays on the devices and potentially operation thereof.

Some existing security systems are somewhat complicated and utilize a plurality of capturing or hold-down elements that engage the perimeter edge of the device being displayed. Oftentimes these systems are designed so that a relatively high degree of skill and care are required to assure proper securement of a device. Given the many "touches" of a device during a business day, an improperly secured device is likely to be detected by a would-be thief.

These complicated systems are also undesirable from the standpoint that setup may be time consuming, thereby occupying valuable time of employees. This problem is aggravated by the fact that the devices may be regularly replaced at the displays.

Still further, given that employees that have responsibilities for setting up security systems may be rewarded more for sales efforts than security-related tasks, shortcuts are often taken, resulting in ineffective security systems setup, as a result of which devices become more vulnerable to theft.

Another problem that has persisted is that displays with security systems are commonly configured for a particular device size and shape, within a very limited range. Thus, supporting display structures with different capacities must be inventoried in amounts based upon anticipated numbers of particular sizes and configurations of devices to be displayed. As devices change, and consumption of devices change from anticipated numbers, there may be excess or shortage of a certain support type. Further, due to the ongoing change in device configuration, certain supports may become practically unusable, which necessitates their staging or disposal.

A business may also wish to change displays by switching locations of where devices are displayed. If a different device is dimensionally incompatible with a device for which it is to be substituted, a store owner may have to choose between foregoing the display makeover or engaging in the more complicated task of relocating entire support structures.

Still further, there may be times that a displayed device is the only one available for inspection. If a potential purchaser wishes to handle a device separate from the display, an employee may have to free the displayed device for this purpose. If the support structure is complicated, such that separation of the displayed device and reengagement thereof are time consuming, this exercise may not be practical, as a result of which a sales opportunity may be lost.

The industry continues to seek out alternative security system designs for portable articles/devices, and particularly those in the category of the smart phone and tablet. Designers of these systems continue to be challenged by the often competing objectives of providing effective security while at the same time offering an affordable, versatile system that can be consistently set up, as by store personnel, who may not be mechanically skilled or inclined to invest any significant amount of time in system setup.

SUMMARY OF THE INVENTION

In one form, the invention is directed to the combination of: a) a portable article having a body with a peripheral edge; and b) a support assembly for displaying the portable article. The support assembly has a frame configured to engage the body so as to support the first portable article in a display position. The frame has first and second frame parts movable one relative to the other to change a dimension of a receiving space defined by the first and second frame parts for a part of the first portable article with the first portable article in the display position. The frame is configured so that: a) relative movement can be effected between the first and second frame parts between: i) a first relationship wherein the receiving space defined by the first and second frame parts has a first receiving dimension; and ii) a second relationship wherein the receiving space defined by the first and second frame parts has a second receiving dimension that is less than the first receiving dimension; and b) the first and second frame parts upon being changed from the first relationship into the second relationship are blocked from changing from the second relationship back into the first relationship.

In one form, the support assembly has a pedestal configuration.

In one form, the support assembly has a holding assembly having first and second states. The holding assembly in the first state: a) allows the first and second frame parts to be changed from the first relationship into the second relationship; and b) blocks the first and second frame parts, upon being changed from the first relationship into the second relationship, from being changed from the second relationship into the first relationship. The holding assembly, upon being changed from the first state into the second state, allowing the first and second frame parts to be changed from the second relationship back into the first relationship.

In one form, the support assembly has an actuator that is operable to change the holding assembly from the first state into the second state. The actuator is blocked from being accessed with the first portable article in the display position.

In one form, the actuator is a component that is biased into a first position and movable against a bias force to change the component from the first position into a second position, as an incident of which the holding assembly is changed from the first state into the second state.

In one form, the frame defines a support surface for the first portable article in the display position. One of the first and second frame parts defines a first holding surface. A part of the first portable article is captive between the first holding surface and support surface with the first portable article in the display position and the first and second frame parts in the second relationship.

In one form, the other of the first and second frame parts defines a second holding surface. Another part of the first portable article is captive between the second holding surface and support surface with the first portable article in the display position and the first and second frame parts in the second relationship.

In one form, the holding assembly and first and second frame parts are configured to define a ratchet arrangement that with the holding assembly in the first state allows the first and second frame parts to be changed from the first relationship into the second relationship and blocks the first and second frame parts, upon being changed from the first relationship into the second relationship, from being changed from the second relationship into the first relationship.

In one form, the holding assembly has a body. There is a toothed rack and pawl cooperating relationship between the holding assembly body and each of the first and second frame parts that defines the ratchet arrangement.

In one form, the first and second frame parts respectively have first and second blocking surfaces that face each other and between which the receiving space is defined. The first and second blocking surfaces each face the peripheral edge of the first portable article with the first portable article in the display position.

In one form, the first and second blocking surfaces move towards and away from each other along a first line as the first and second frame parts are changed between the first and second relationships. The support assembly further includes a third frame part movable relative to the first portable article in the display position in a first path transverse to the first line. The third frame part has a third blocking surface facing the peripheral edge of the first portable article with the first portable article in the display position.

In one form, the frame has a support surface for the first portable article in the display position. The first, second, and third frame parts successively define first, second, and third holding surfaces. The first portable article is captive between the support surface and each of the first, second, and third holding surfaces with the first portable article in the display position.

In one form, the support assembly is configured so that the third frame part can be moved in one direction in the first path from a starting position into a holding position wherein the third blocking surface is moved closer to the peripheral edge of the first portable article in the display position than with the third frame part in the starting position.

In one form, the support assembly is configured so that upon the third frame part moving from the starting position into the holding position, the third frame part is blocked from moving from the holding position back into the starting position.

In one form, the support assembly is configured to form a U-shaped receptacle defined at least in part by the first, second, and third frame parts. The U-shaped receptacle and first portable article are relatively configured so that with the first portable article and support assembly in a pre-assembly relationship, the first portable article can be advanced in a first direction in an assembly path into the display position and is blocked from being separated from the display position other than by moving the first portable article oppositely to the first direction in the assembly path. The support assembly further includes a blocking assembly that is changeable between blocking and release states. The blocking assembly in the blocking state blocks movement of the first portable article in the display position oppositely to the first direction in the assembly path as would allow separation of the first portable article from the support assembly. The blocking assembly in the release state allows movement of the first portable article in the display position oppositely to the first direction in the assembly path to allow separation of the first portable article from the support assembly.

In one form, the support assembly further includes a locking assembly having locked and unlocked states. The locking assembly in the locked state prevents changing of the blocking assembly from the blocking state into the release state.

In one form, the locking assembly is configured so that: a) a security actuator component is required to change the locking assembly from the locked state into the unlocked state; and b) the locking assembly can be changed from the unlocked state into the locked state without requiring use of a security actuator component.

In one form, the combination further includes a security actuator component that is configured to mechanically and/or electronically interact with the locking assembly to change the state of the locking assembly.

In one form, the first portable article is one of a phone and a tablet.

In one form, the invention is directed to the support assembly described above.

BRIEF DESCRIPTION OF THE DRAWINGS

FIGS. 3 and 4 are reduced perspective views of the support assembly in FIG. 2 in different states;

FIG. 5 is a view as in FIG. 4 wherein a portable article to be displayed is placed in a preliminary mounting position;

FIG. 6 is a view as in FIG. 5 with the support assembly reconfigured so that the portable article is maintained in the display position;

FIG. 8 is a schematic representation of a locking assembly for the support assembly in FIGS. 1-7 and showing an associated security actuator component;

DETAILED DESCRIPTION OF THE PREFERRED EMBODIMENT

Figure 1:
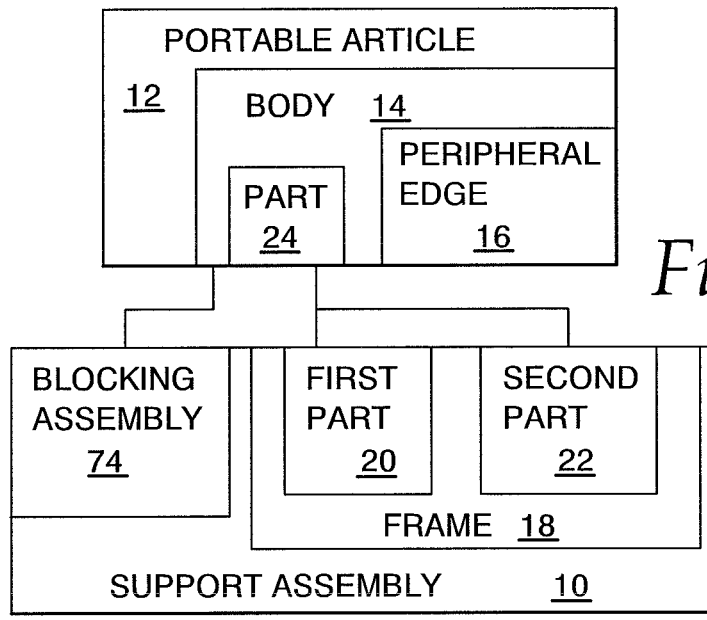
FIG. 1 is a schematic representation of a support assembly, according to the invention, for displaying a portable article, which is also shown schematically in this figure.

The present invention is directed to a support assembly, shown schematically in FIG. 1 at 10. The support assembly 10 is used in combination with a portable article 12 to display the portable article 12, as at a point-of-purchase display. The portable article 12 may be any article that is commonly displayed for inspection by individuals considering purchase. As just examples, the portable article may be a smart phone, a tablet, etc. These types of articles 10 each has a body 14 with a peripheral edge 16.

The support assembly 10 has a frame 18 configured to engage the portable article body 14 so as to support the portable article 12 in a display position. The frame 18 has first and second parts 20, 22, movable one relative to the other, to change a dimension of a receiving space defined by the first and second frame parts 20, 22 for a part 24 of the portable article 12, with the portable article in the display position.

The frame 18 is configured so that: a) relative movement can be effected between the first and second frame parts 20, 22 between: i) a first relationship wherein the receiving space defined by the first and second frame parts 20, 22 has a first receiving dimension; and ii) a second relationship wherein the receiving space defined by the first and second frame parts 20, 22 has a second receiving dimension that is less than the first receiving dimension; and b) the first and second frame parts 20, 22, upon being changed from the first relationship into the second relationship, are blocked from changing from the second relationship back into the first relationship.

The schematic representation of each of the components in FIG. 1 is intended to encompass the specific forms thereof described hereinbelow and virtually an unlimited number of variations of those components and their interaction.

The disclosure herein is intended to be read in conjunction with the disclosure in application Ser. No. 62/683,880, the disclosure of which is incorporated herein by reference.

Referring now to FIGS. 2-7, support assemblies with specific forms of the components in FIG. 1 are shown, with it being understood that structures in those Figures, and the description thereof hereinbelow, relate to exemplary forms of the invention. The invention is not limited to any of those specific forms.

The basic operation of the support assembly 10 will be described as used to support and maintain the portable article 12, in the form of a smart phone, in a display position, as shown in FIG. 6.

The support assembly 10 has a pedestal configuration whereby the portable article 12 in the display position is elevated above a support surface 26 upon which the support assembly 10 is fixedly mounted through appropriate securing structure, as shown schematically at 28 in FIG. 3. The details of the securing structure 28 are not critical to the present invention. Typically, different types of threaded fasteners will be used to fix the support assembly 10 to the support surface 26 at a desired display location.

The frame 18 consists of an upright base 30 upon which an adjustable article-engaging structure 32 is fixed. The article-engaging structure 32 defines a support surface 34 to bear against a back side 36 of the portable article 12. The support surface 34 is generally flat and inclined, whereby with the portable article 12 placed thereagainst, a screen/monitor 38 faces upwardly and forwardly to be readily viewable by an individual observing the portable article in its display position.

The frame 18 consists of a plurality of components, as described hereinbelow, that cooperatively maintain the portable article 12 in the display position in a manner whereby it can be released only through use of a security actuator component, as shown schematically at 40 in FIG. 8, that mechanically and/or electrically interacts with a locking assembly 41 and is usable to change the locking assembly 41 from a locked state into an unlocked state.

The first and second frame parts 20, 22 have edge grippers 42, 43, respectively, each with an "L" shape. The frame parts 20, 22, at the edge grippers 42, 43, define facing blocking surfaces 44, 46, respectively, between which the aforementioned receiving space 48 is defined. The receiving space 48 has a dimension D for receiving the part 24 of the portable article body 12, which in this case is the width dimension W of the body 14 for the portable article 12. The dimension D of the receiving space 48 is changeable by effecting relative movement between the frame parts 20, 22.

In this embodiment, both frame parts 20, 22 are movable relative to the upright base 30 to change their relationship. However, it is only necessary that one of the frame parts 20, 22 be movable relative to the upright base 30. In this form, relative movement occurs in paths along a line, indicated by the double-headed arrow 50 in FIG. 2.

In FIGS. 4 and 5, the frame parts 20, 22 have a first relationship wherein the receiving space 48 has a first receiving dimension D1. In FIGS. 3 and 6, the frame parts 20, 22 are shown changed from their first relationship into a second relationship wherein the receiving space 48 has the reduced receiving dimension D. The ability of the first and second frame parts 20, 22 to move relative to each other allows accommodation of different widths of portable article 12.

As seen in FIG. 6, the frame parts 20, 22 are moved towards each other to engage the peripheral edge 16 of the article body 14 to thereby captively engage the width of the portable article 12.

The first and second frame parts 20, 22, respectively have first and second holding surfaces 52, 54, defined on the grippers 42, 43, which captively hold parts of the portable article body 14 against the support surface 34 with the portable article 12 in the display position of FIG. 6.

The support assembly 10 further has a third frame part 56 that is movable relative to the upright base 30, and portable article 12 in the display position, in a path indicated by the double-headed arrow 58 in FIG. 3, that is transverse to the path of the first and/or second frame parts 20, 22, indicated by the arrow 50. In this embodiment each of the paths is a straight line path.

The third frame part 56 has separate edge grippers 60, 62, which move in the path 58. The grippers 60, 62 perform the same function. While only one such gripper 60, 62 is required, the use of multiple grippers 60, 62 allows an extended contact region for the portable article 12. Both grippers 60, 62 cooperate with the portable article in the same manner. Exemplary gripper 60 has a blocking surface 64 that faces the peripheral edge 16 of the portable article 12 with the portable article 12 in the display position.

The gripper 60 has a third holding surface 66 that captively maintains a part of the portable article body 14 against the support surface 34 at a bottom region of the portable article 12, with the portable article 12 in the display position.

Figure 2:
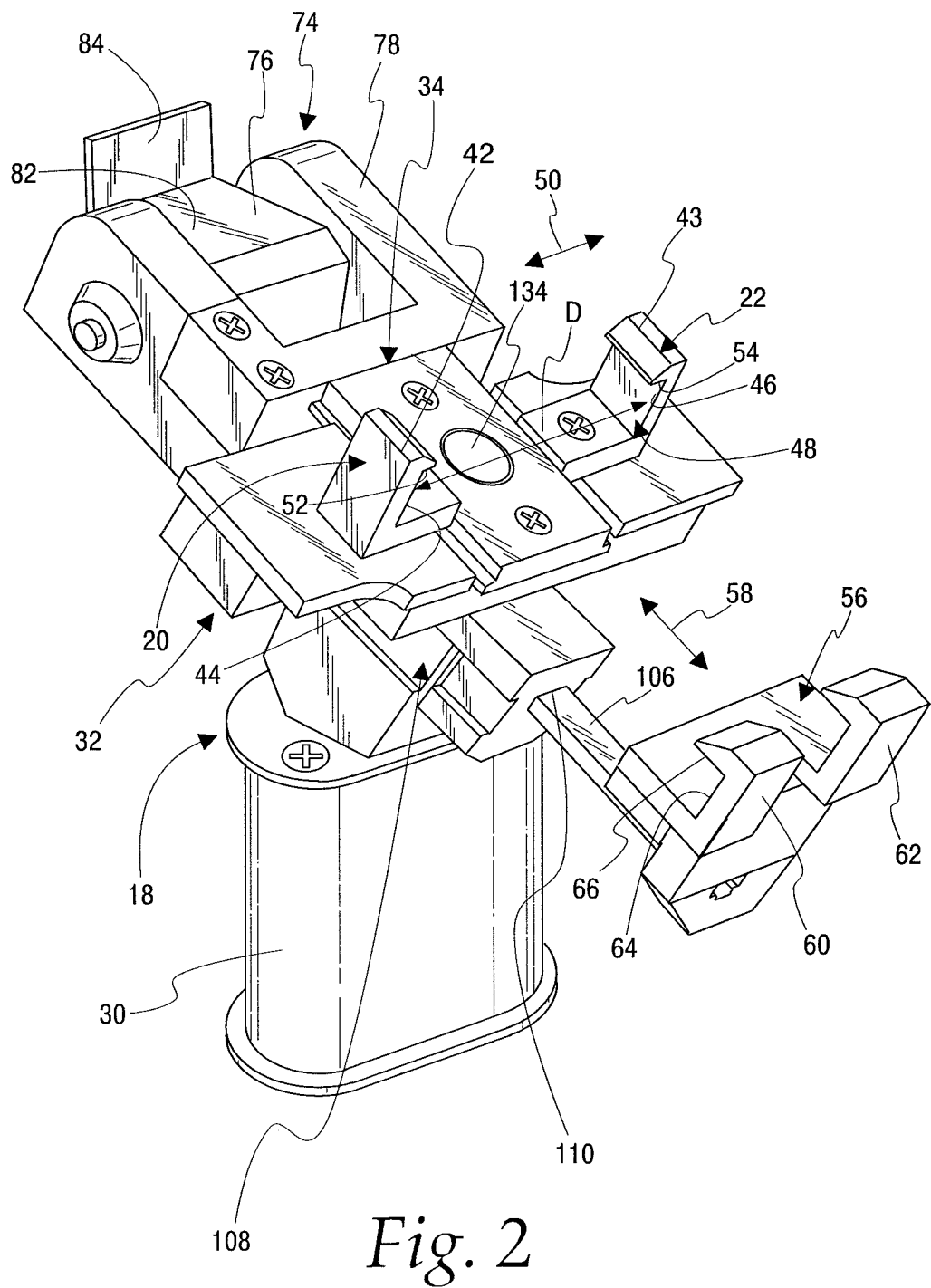
FIG. 2 is a perspective view of one form of support assembly, as shown schematically in FIG. 1.

In FIGS. 2, 4, and 5, the third frame part 56 is shown in a starting position. By moving the third frame part 56 in one direction in its path, as indicated by the arrow 68 in FIG. 5, the third frame part 56 can be moved into a holding position as shown in FIG. 6. In the transition between FIGS. 5 and 6, the portable article 12 is shown being together moved with the third frame part 56 as it is changed between starting and holding positions. Alternatively, the portable article can be placed in the ending display position of FIG. 6, whereupon in changing from the starting position into the holding position, the third frame part 56 is repositioned so that the blocking surface 64 thereon is moved closer to the peripheral edge 16 of the portable article 12 in the display position than with the third frame part 56 in its starting position.

With the portable article 12 in the display position and the blocking surfaces 44, 46, 64 advanced to adjacent to, or against, the peripheral edge 16 of the portable article body 14, the portable article is captive between the support surface 34 and each of the first, second, and third holding surfaces 52, 54, 66.

Figure 9:
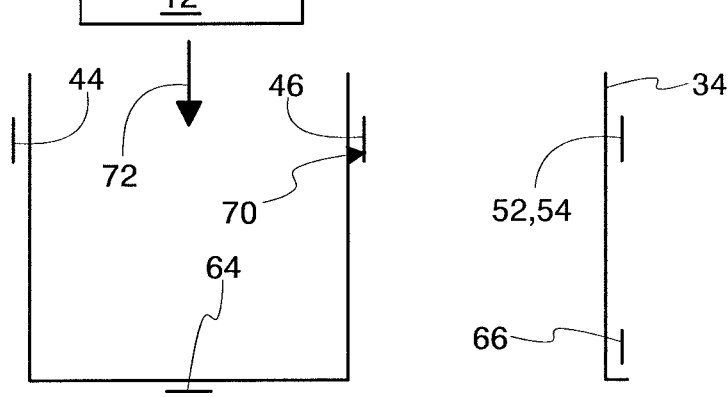
FIG. 9 is a schematic representation of a shape of a receptacle for the portable article defined by various components on the support assembly.
Figure 10:
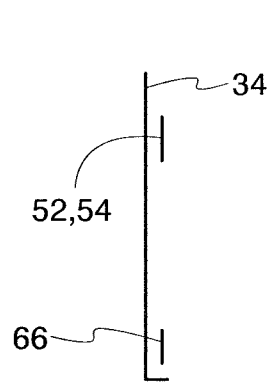
FIG. 10 is a view as in FIG. 9 from a different perspective.

As shown schematically in FIGS. 9 and 10, the aforedescribed structures cooperatively define a U-shaped receptacle 70 for receipt of the portable article body 14. With the dimension of the receiving space 48 at least nominally matched to the width of the portable article body 14, the portable article can be aligned with the receptacle 70 and advanced, from a preassembly relationship, fully separated from the support assembly, in an assembly path in the direction of the arrow 72. The sides of the portable article 12 are guided by the blocking surfaces 44, 46 until the bottom of the portable article 12 is situated against or adjacent to the blocking surface 64. Movement of the portable article 12 in a forward direction away from the support surface 34 on the frame 18 is confined by the holding surfaces 52, 54, 66 during this process. Once the portable article 12 is in the display position, the portable article 12 is blocked from being separated from the display position other than by moving the portable article 12 oppositely to the direction of the arrow 72 in the assembly path.

As shown in one form in FIGS. 2-7, and schematically in FIG. 1, the support assembly 10 further includes a blocking assembly 74 to selectively prevent the portable article 12 from being withdrawn from the display position by movement in the assembly path oppositely to the direction of the arrow 72 in FIG. 9.

More specifically, the blocking assembly 74 has a blocking component 76 that is movable relative to a support 78 on the frame 18 between first and second positions, shown respectively in FIGS. 2; 4; 5 and 3; 6. The first position of the blocking component 76 represents a release state for the blocking assembly 74, with the second position representing a blocking state therefor.

With the blocking component 76 in the first position, the portable article 12 can be slid upwardly along the support surface 34, without interference from the blocking component 76, a distance adequate to allow the portable article 12 to be separated from the frame 18 without interference from the frame parts 20, 22, 56.

With the portable article 12 in the display position, the blocking component 76 can be pivoted relative to the support 78 in the direction of the arrow 80 in FIG. 6, which brings a blocking surface 82 on the blocking component 76 into close proximity to the perimeter edge 16 of the portable article body 14 and a holding surface 84 into overlying relationship with the front of the portable article body 14, whereby the top region of the portable article 12 is captive between the holding surface 84 and the support surface 34.

With the portable article 12 in the display position and the blocking assembly 74 in the blocking state, the portable article 12 is blocked from being withdrawn from the aforementioned receptacle 70, by movement relative to the frame 18 within the plane of the "U" in FIG. 9, and at the same time is captively held against the support surface 34 by the multiple holding surfaces 52, 54, 66, 84.

Figure 7:
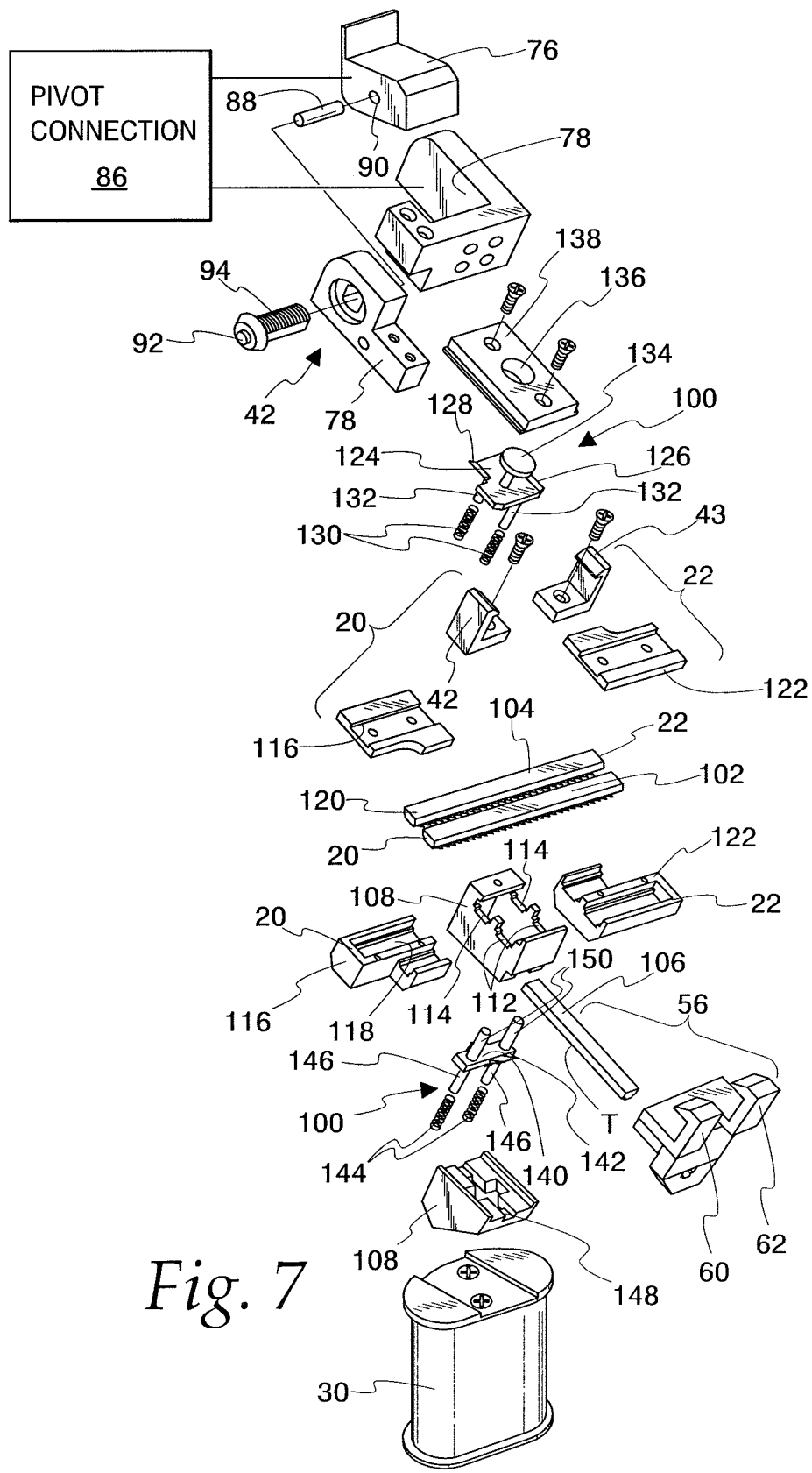
FIG. 7 is a reduced, exploded, perspective view of the support assembly in FIGS. 2-6.

As shown schematically in FIG. 7, the blocking component 76 is mounted to the support 78 for pivoting movement about an axis through a pivot connection 86.

The locking assembly 42 consists of a plunger/pin 88 that is advanced into a bore 90 on the blocking component 76, with the blocking assembly in the blocking state. The plunger/pin 88 is advanced into the bore 90 through a press button actuator 92 that is spring biased outwardly from a cylinder 94 that makes a keyed connection with a part of the support 78 so that the cylinder 94 cannot freely turn relative to the support 78 around the lengthwise axis of the cylinder 94. Details of the depicted locking assembly 42 are set forth in greater detail in application Ser. No. 62/683,880.

Briefly, the actuator 92 can be depressed to advance the plunger/pin 88 to place the locking assembly in a locked state. In this locked state, the blocking component 76 is precluded from pivoting so as to change the blocking assembly from the blocking state into the release state. Depression of the actuator 92 can be effected without using any special tool or component, with this state maintained until changed through the aforementioned security actuator component 40. In the exemplary form, as shown in FIG. 3, the security actuator component 40 is in the form of a mechanical key that can be inserted into the cylinder 94 and turned to change the locking assembly 40 from its locked state into its unlocked state.

Figure 11:
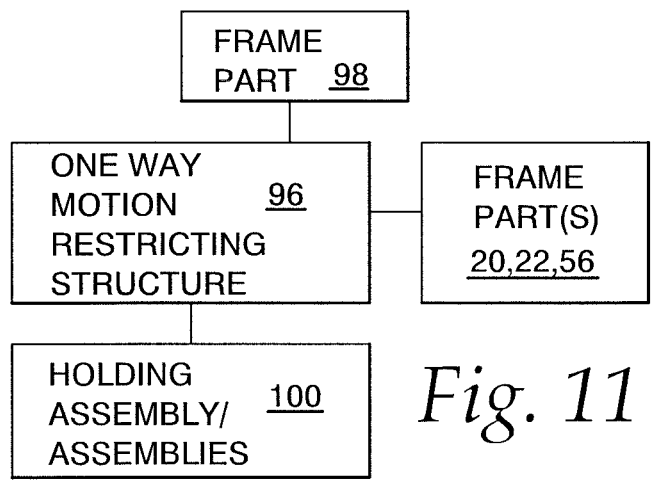
FIG. 11 is a schematic representation of a one-way motion restricting structure that cooperates between certain frame parts to facilitate changing of dimensions of a receptacle for the article to be displayed.

In a preferred form, as described briefly above, a one-way motion-restricting structure, as shown schematically at 96 in FIG. 11, cooperates between one or more of the frame parts 20, 22, 56 and another part 98 of the frame, whereby the frame parts 20, 22, 56 can be relatively moved so as to capture the portable article 12 in the display position but, once positioned to capture the portable article 12, cannot be moved so as to effect release thereof without operating one or more holding assemblies 100. The holding assemblies 100 are designed to preclude unauthorized operation thereof.

More specifically, each of the frame parts 20, 22, 56 consists of a toothed slide bar 102, 104, 106, successively. The slide bars 102, 104, 106 are guided for movement in respective paths by a guide housing 108. Each of the slide bars 102, 104, 106 has a generally T-shaped cross-sectional configuration. This particular shape is not critical but is one exemplary form that allows a complementarily-shaped slot or opening to guide the slide bars 102, 104, 106 in translation relative to the guide housing 108 in their respective linear paths without allowing twisting about their lengths. The guide housing 108 has a slot 110 at the bottom thereof to guide the slide bar 106 in the path previously identified by the double-headed arrow 58.

The guide housing 108 has adjacent slots 112, 114 respectively to guide the slide bars 102, 104 in parallel linear paths along the line indicated previously by the double-headed arrow 50.

The frame part 20 has a two part support plate 116 that is fixed to the end of slide bar 102 and defines a slot portion 118 to guide the free end 120 of the slide bar 104 as the frame parts 20, 22 are repositioned to reduce the dimension of the receiving space 48 to a relatively narrow dimension. The frame part 22 has a corresponding support plate 122, with a mirrored shape, for the slide bar 102 associated with the frame part 20.

While not required, the one-way motion restricting structure 96 and the holding assembly/assemblies 100 are preferably configured to define a ratchet arrangement, with the holding assembly/assemblies 100 defining pawls that cooperate with teeth T on the slide bars 102, 104 that define toothed racks. Of course, the rack and pawl locations can be reversed. With the holding assembly 100 in a first state, the first and second frame parts 20, 22 can be incrementally changed from their first relationship into their second relationship, but once in the second relationship, are blocked from being changed from the second relationship back into the first relationship.

The holding assembly 100 consists of a body 124 with edges/pawls 126, 128 that are situated to engage the teeth T on the slide bars 102, 104. The body 124 is situated so that the pawls 126, 128 reside directly under the teeth T on the slide bars 102, 104. Compression coil springs 130, each surrounding a post 132 on the body 124, act between the guide housing 108 and the body 124 to normally simultaneously urge the pawls 126, 128 between teeth T on the respective slide bars 102, 104. With the edges/pawls 126, 128 between adjacent teeth T, the parts perform a conventional ratchet function. In this relationship, the holding assembly 100 is in a first state wherein a user can simply translate the frame parts 20, 22 incrementally relative to each other to reduce the dimension of the receiving space 48. Once reduced, the receiving space 48 cannot be enlarged to allow separation of the portable article 12.

An actuator 134 is provided on the body 124 and is operable to change the holding assembly 100 from the first state into a second state wherein the edges/pawls 126 disengage from between the teeth T on the slide bars 102, 104. More specifically, the actuator is in the form of a component 134 that is operable to change the holding assembly 100 from the first state into the second state. The actuator component 134 is biased by the springs 130 normally into a first position. The actuator component 134 moves as one piece with the body 124 so that the holding assembly is normally biased into the first state and the actuator component 134 is biased into the first position therefor.

By pressing the actuator component 134, the body 124 and actuator component 134 are moved against the bias force of the springs 130, whereby the actuator component is changed from the first position into a second position and the holding assembly is changed from the first state into the second state.

The actuator component 134 is guided within a slot 136 on a cover plate 138. The cover plate 138 also captively maintains the slide bars 102, 104 against the guide housing 108. The cover plate 138 is situated so that the portable article 12, in the display position, overlies the slot 136 and thus prevents access to the actuator component 134.

A separate body 140 carries a separate edge/pawl 142 that cooperates with the teeth T on the slide bar 106. The body 140 is normally biased by coil springs 144 surrounding posts 146 on the body 140. The springs 144 act between a lower component 148 of the guide housing 108 and the body 140 to urge the edge/pawl 142 between the teeth T on the slide bar 106.

The same body 124 is situated to engage actuating posts 150 on the body 140 whereby depression of the actuator component 134 causes the body 124 to move the body 140 against the biasing force of the springs 144 to disengage the edge/pawl 142 from the teeth T on the slide bar 106.

The teeth T on the slide bar 106 and cooperating pawl 142 produce a similar ratchet arrangement whereby the grippers 60, 62 can be incrementally advanced towards the portable article 12 in the display position, but are blocked from moving away therefrom. Thus, the third frame part 56 can be placed in the starting position of FIG. 4 and advanced into the holding position of FIG. 6 by simply performing a pressing step.

The above structure affords positive security while allowing adaptation to differently sized articles to be displayed. The invention allows a construction whereby the support assembly can be adjusted to conform to an article to be displayed and placed in a state wherein the article is secured, without requiring any tools. More specifically, starting with the support assembly in the FIG. 3 state, the actuator component 134 can be depressed in the direction of the arrow 152 to allow repositioning of the frame parts 20, 22, 56 to allow enlargement of the receptacle 70, as shown in FIG. 4. The receptacle 70 can be made significantly larger than the portable article 12 to be displayed.

The portable article 12 can then be placed on the support surface 34, whereupon the frame parts 20, 22, 56 can be translated under a pressing force to move the blocking surfaces 44, 46, 64 against, or in close proximity to, the perimeter edge 16 of the portable article 12. As this occurs, the holding surfaces 52, 54, 66 capture the article body 14 against the support surface 34. The blocking component 76 can then be pivoted to the FIG. 6 position and the actuator 92 pressed to lock the blocking component 76 in the FIG. 6 position.

In this state, the locking assembly 42 cannot be unlocked without an appropriate security actuator component 40. At the same time, the first, second, and third frame parts 20, 22, 56 cannot be moved without accessing the actuator component 134, which is inaccessible by reason of being blocked by the displayed article 12.

Figure 12:
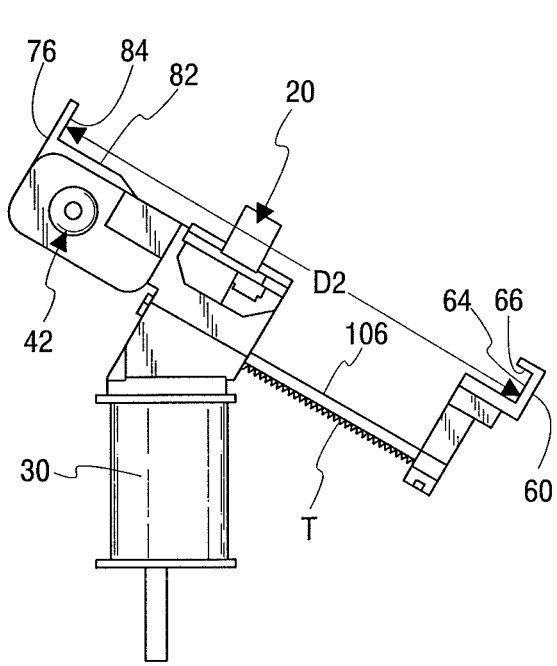
FIG. 12 is a side perspective view of the support assembly in the FIG. 4 state.
Figure 13:
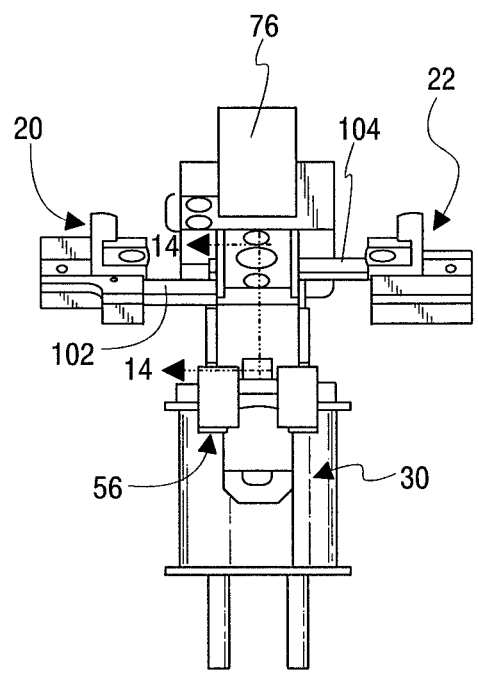
FIG. 13 is a front elevation view of the support assembly in the FIG. 12 state.
Figure 14:
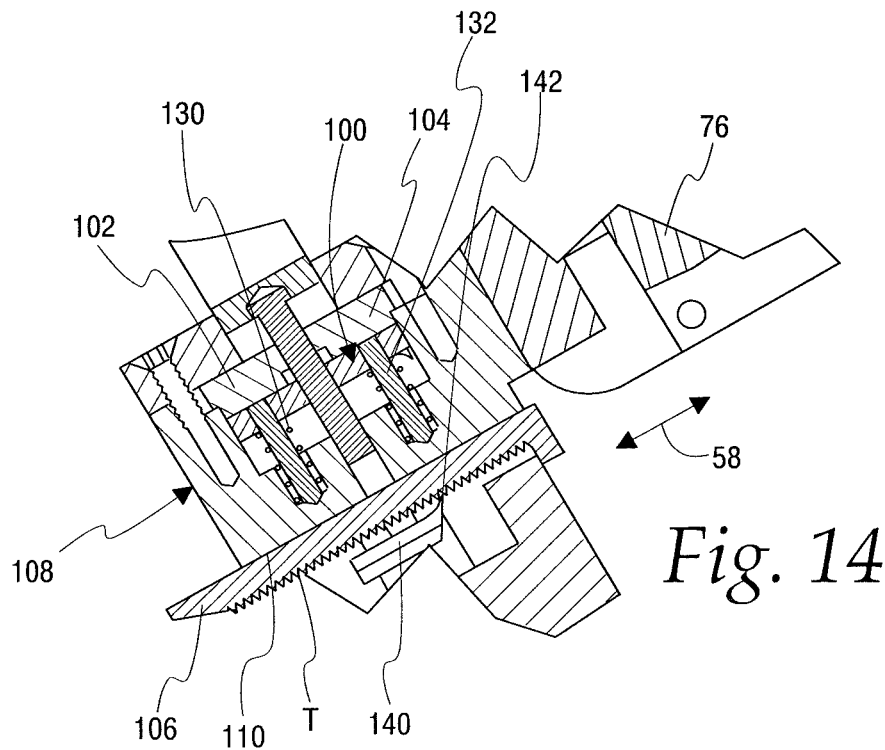
FIG. 14 is an enlarged, cross-sectional view of the support assembly taken along line 14-14 of FIG. 13.
Figure 15:
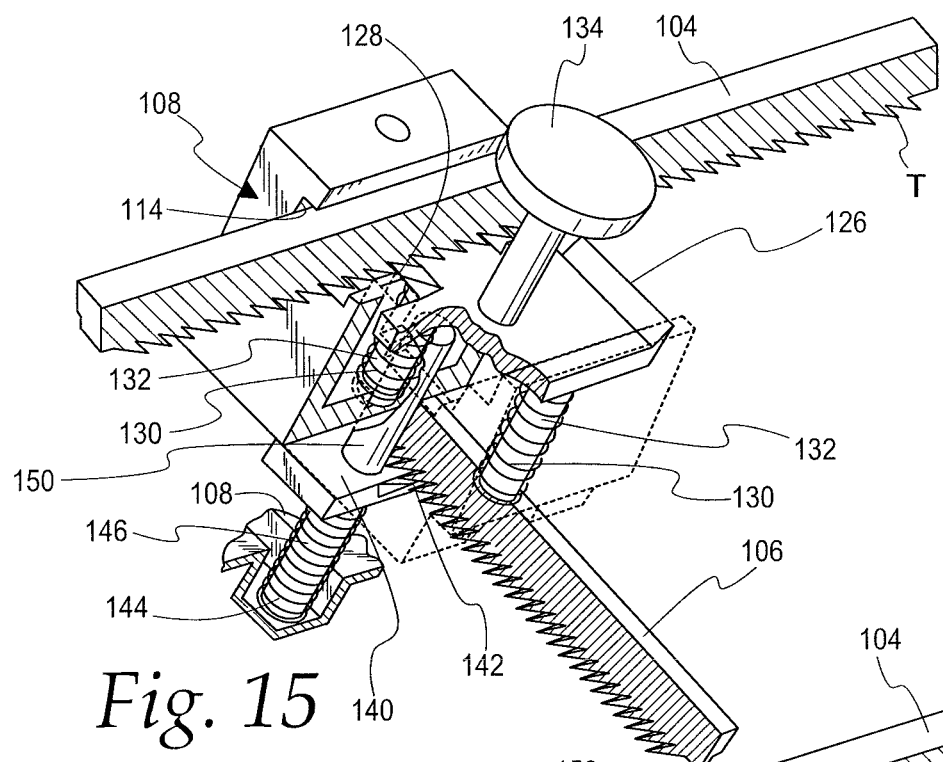
FIG. 15 is an enlarged, fragmentary, perspective view showing a pawl and ratchet arrangement making up part of the one-way motion restricting structure for relatively movable frame parts on the support assembly.
Figure 16:
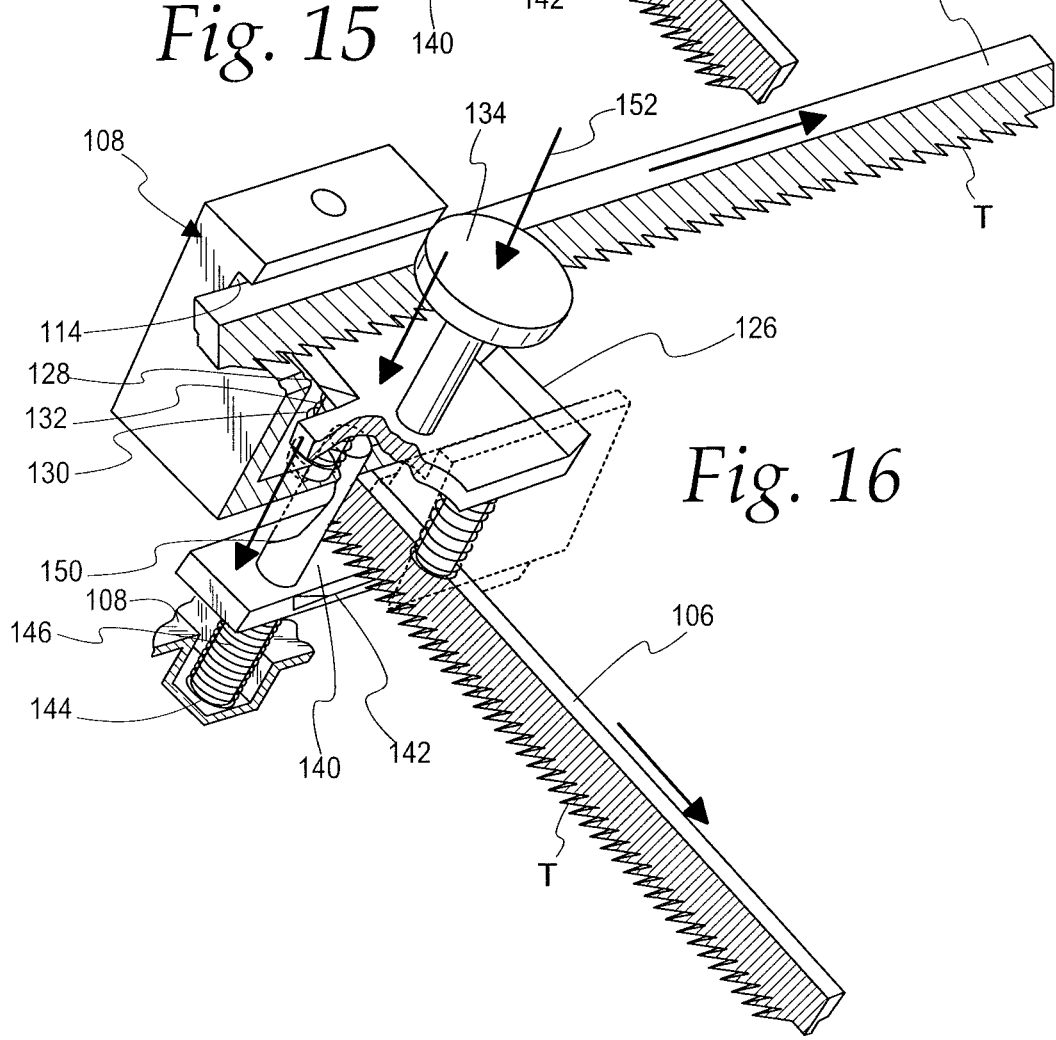
FIG. 16 is a view as in FIG. 16 with the one-way motion restricting structure in a different state.

In an exemplary form, the components are dimensioned so that the receiving dimension D1 is on the order of 4 inches and the largest transverse receiving dimension D2 (FIG. 12) is on the order of 6.5 inches. The support assembly, so dimensioned, will accommodate a number of different smart phone models offered by different companies.

By changing the size of the components that dictate the transverse receiving dimensions, different sizes and shapes of electronic devices can be accommodated. As just examples, larger smart phones and tablets might be accommodated.

Aside from strategically selecting the dimensions D1, D2, and their relative sizes, the shape and/or size of the edge grippers 42, 43, 60, 62 might be chosen to accommodate different electronic devices. For example, the shape, vertical extent, and degree of overlying of the holding surfaces 52, 54, 66, with respect to a displayed article, might be changed to adapt to different article shapes and sizes.

Further, interchangeable parts may be offered to allow adaptation of a base assembly to different articles.

The foregoing disclosure of specific embodiments is intended to be illustrative of the broad concepts comprehended by the invention.

The invention claimed is:
1. In combination:
 a) a first portable article having a body with a peripheral edge; and b) a support assembly for displaying the portable article, the support assembly comprising:

a frame configured to engage the body so as to support the first portable article in a display position;

the frame comprising first and second frame parts movable one relative to the other to change a dimension of a receiving space defined by the first and second frame parts for a part of the first portable article with the first portable article in the display position, the frame configured so that: a) relative movement can be effected between the first and second frame parts between: i) a first relationship wherein the receiving space defined by the first and second frame parts has a first receiving dimension; and ii) a second relationship wherein the receiving space defined by the first and second frame parts has a second receiving dimension that is less than the first receiving dimension; and b) the first and second frame parts as an incident of being changed from the first relationship into the second relationship are blocked from changing from the second relationship back into the first relationship, wherein the support assembly comprises a holding assembly having first and second states, the holding assembly in the first state: a) allowing the first and second frame parts to be changed from the first relationship into the second relationship; and b) blocking the first and second frame parts upon being changed from the first relationship into the second relationship from being changed from the second relationship into the first relationship, the holding assembly upon being changed from the first state into the second state allowing the first and second frame parts to be changed from the second relationship back into the first relationship, wherein the support assembly comprises an actuator that is operable to change the holding assembly from the first state into the second state and the actuator is blocked by the first portable article from being accessed with the first portable article in the display position and directly exposed to be operated as an incident of the first portable article being moved from the display position away from the support assembly.

2. The combination according to claim 1 wherein the support assembly has a pedestal configuration.

3. The combination according to claim 1 wherein the frame defines a support surface for the first portable article in the display position, and one of the first and second frame parts defines a first holding surface, a part of the first portable article captive between the first holding surface and support surface with the first portable article in the display position and the first and second frame parts in the second relationship.

4. The combination according to claim 3, wherein the other of the first and second frame parts defines a second holding surface and another part of the first portable article is captive between the second holding surface and support surface with the first portable article in the display position and the first and second frame parts in the second relationship.

5. The combination according to claim 1 wherein the holding assembly and first and second frame parts are configured to define a ratchet arrangement that with the holding assembly in the first state allows the first and second frame parts to be changed from the first relationship into the second relationship and blocks the first and second frame parts, upon being changed from the first relationship into the second relationship, from being changed from the second relationship into the first relationship.

6. The combination according to claim 5 wherein the holding assembly comprises a body and there is a toothed rack and pawl cooperating relationship between the holding assembly body and each of the first and second frame parts that defines the ratchet arrangement.

7. The combination according to claim 1 wherein the first and second frame parts respectively have first and second blocking surfaces that face each other and between which the receiving space is defined, the first and second blocking surfaces each facing the peripheral edge of the first portable article with the first portable article in the display position.

8. The combination according to claim 7 wherein the first and second blocking surfaces move towards and away from each other along a first line as the first and second frame parts are changed between the first and second relationships and the support assembly further comprises a third frame part movable relative to the first portable article in the display position in a first path transverse to the first line, the third frame part having a third blocking surface facing the peripheral edge of the first portable article with the first portable article in the display position.

9. The combination according to claim 8 wherein the frame defines a support surface for the first portable article in the display position, the first, second, and third frame parts successively define first, second, and third holding surfaces, and the first portable article is captive between the support surface and each of the first, second, and third holding surfaces with the first portable article in the display position.

10. The combination according to claim 8 wherein the support assembly is configured so that the third frame part can be moved in one direction in the first path from a starting position into a holding position wherein the third blocking surface is moved closer to the peripheral edge of the first portable article in the display position than with the third frame part in the starting position.

11. The combination according to claim 10 wherein the support assembly is configured so that as an incident of the third frame part moving from the starting position into the holding position, the third frame part is blocked from moving from the holding position back into the starting position.

12. The combination according to claim 1 wherein the first portable article is one of a phone and a tablet.

13. In combination:
a) a first portable article having a body with a peripheral edge; and
b) a support assembly for displaying the first portable article, the support assembly comprising:

a frame configured to engage the body so as to support the first portable article in a display position;

the frame comprising first and second frame parts movable one relative to the other to change a dimension of a receiving space defined by the first and second frame parts for a part of the first portable article with the first portable article in the display position, the frame configured so that: a) relative movement can be effected between the first and second frame parts between: i) a first relationship wherein the receiving space defined by the first and second frame parts has a first receiving dimension; and ii) a second relationship wherein the receiving space defined by the first and second frame parts has a second receiving dimension that is less than the first receiving dimension; and b) the first and second frame parts upon being changed from the first relationship into the second relationship are blocked from changing from the second relationship back into the first relationship, wherein the support assembly comprises a holding assembly having first and second states, the holding assembly in the first state: a) allowing the first and second frame parts to be changed from the first relationship into the second relationship; and b) blocking the first and second frame parts upon being changed from the first relationship into the second relationship, wherein the support assembly comprises an actuator that is operable to change the holding assembly from the first state into the second state and the actuator is blocked from being accessed with the first portable article in the display position, wherein the actuator comprises a component that is biased into a first position and movable against a bias force to change the component from the first position into a second position as an incident of which the holding assembly is changed from the first state into the second state.

14. In combination:

a) a first portable article having a body with a peripheral edge; and b) a support assembly for displaying the first portable article, the support assembly comprising:

a frame configured to engage the body so as to support the first portable article in a display position, the frame comprising first and second frame parts movable one relative to the other to change a dimension of a receiving space defined by the first and second frame parts for a part of the first portable article with the first portable article in the display position, the frame configured so that: a) relative movement can be effected between the first and second frame parts between: i) a first relationship wherein the receiving space defined by the first and second frame parts has a first receiving dimension; and ii) a second relationship wherein the receiving space defined by the first and second frame parts has a second receiving dimension that is less than the first receiving dimension; and b) the first and second frame parts upon being changed from the first relationship into the second relationship are blocked from changing from the second relationship back into the first relationship, wherein the first and second frame parts respectively have first and second blocking surfaces that face each other and between which the receiving space is defined, the first and second blocking surfaces each facing the peripheral edge of the first portable article with the first portable article in the display position, wherein the first and second blocking surfaces move towards and away from each other along a first line as the first and second frame parts are changed between the first and second relationships, wherein the support assembly further comprises a third frame part movable relative to the first portable article in the display position in a first path transverse to the first line, the third frame part having a third blocking surface facing the peripheral edge of the first portable article with the first portable article in the display position, wherein the support assembly is configured so that the third frame part can be moved in one direction in the first path from a starting position into a holding position wherein the third blocking surface is moved closer to the peripheral edge of the first portable article in the display position than with the third frame part in the starting position, wherein the support assembly is configured to form a U-shaped receptacle defined at least in part by the first, second, and third frame parts, the U-shaped receptacle and first portable article relatively configured so that with the first portable article and support assembly in a pre-assembly relationship, the first portable article can be advanced in a first direction in an assembly path into the display position and is blocked from being separated from the display position other than by moving the first portable article oppositely to the first direction in the assembly path, wherein the support assembly further comprises a blocking assembly that is changeable between blocking and release states, the blocking assembly in the blocking state blocking movement of the first portable article in the display position oppositely to the first direction in the assembly path as would allow separation of the first portable article from the support assembly, the blocking assembly in the release state allowing movement of the first portable article in the display position oppositely to the first direction in the assembly path to allow separation of the first portable article from the support assembly.

15. The combination according to claim 14 wherein the support assembly further comprises a locking assembly having locked and unlocked states, the locking assembly in the locked state preventing changing of the blocking assembly from the blocking state into the release state.

16. The combination according to claim 15 wherein the locking assembly is configured so that: a) a security actuator component is required to change the locking assembly from the locked state into the unlocked state; and b) the locking assembly can be changed from the unlocked state into the locked state without requiring use of a security actuator component.

17. The combination according to claim 16 in combination with the security actuator component that is configured to mechanically and/or electronically interact with the locking assembly to change the state of the locking assembly.

18. In combination:

a) a first portable article having a body with a peripheral edge; and b) a support assembly for displaying the first portable article, the support assembly comprising:

a frame configured to engage the body so as to support the first portable article in a display position, the frame comprising first and second frame parts movable one relative to the other to change a dimension of a receiving space defined by the first and second frame parts for a part of the first portable article with the first portable article in the display position, the frame configured so that: a) relative movement can be effected between the first and second frame parts between: i) a first relationship wherein the receiving space defined by the first and second frame parts has a first receiving dimension; and ii) a second relationship wherein the receiving space defined by the first and second frame parts has a second receiving dimension that is less than the first receiving dimension; and b) the first and second frame parts upon being changed from the first relationship into the second relationship are blocked from changing from the second relationship back into the first relationship, wherein the first and second frame parts respectively have first and second blocking surfaces that face each other and between which the receiving space is defined, the first and second blocking surfaces each facing the peripheral edge of the first portable article with the first portable article in the display position, wherein the first and second blocking surfaces move towards and away from each other along a first line as the first and second frame parts are changed between the first and second relationships, wherein the support assembly further comprises a third frame part movable relative to the first portable article in the display position in a first path transverse to the first line, the third frame part having a third blocking surface facing the peripheral edge of the first portable article with the first portable article in the display position, wherein the support assembly is configured so that the third frame part can be moved in one direction in the first path from a starting position into a holding position wherein the third blocking surface is moved closer to the peripheral edge of the first portable article in the display position than with the third frame part in the starting position, wherein the support assembly is configured so that upon the third frame part moving from the starting position into the holding position, the third frame part is blocked from moving from the holding position back into the starting position, wherein the support assembly is configured to form a U-shaped receptacle defined at least in part by the first, second, and third frame parts, the U-shaped receptacle and first portable article relatively configured so that with the first portable article and support assembly in a pre-assembly relationship, the first portable article can be advanced in a first direction in an assembly path into the display position and is blocked from being separated from the display position other than by moving the first portable article oppositely to the first direction in the assembly path, the support assembly further comprises a blocking assembly that is changeable between blocking and release states, the blocking assembly in the blocking state blocking movement of the first portable article in the display position oppositely to the first direction in the assembly path as would allow separation of the first portable article from the support assembly, the blocking assembly in the release state allowing movement of the first portable article in the display position oppositely to the first direction in the assembly path to allow separation of the first portable article from the support assembly.

19. A support assembly for displaying a portable article having a body with a peripheral edge, the support assembly comprising:

a frame configured to engage the body so as to support the portable article in a display position;

the frame comprising first and second frame parts movable one relative to the other to change a dimension of a receiving space defined by the first and second frame parts for a part of the portable article with the portable article in the display position, the frame configured so that: a) relative movement can be effected between the first and second frame parts between: i) a first relationship wherein the receiving space defined by the first and second frame parts has a first receiving dimension; and ii) a second relationship wherein the receiving space defined by the first and second frame parts has a second receiving dimension that is less than the first receiving dimension; and b) the first and second frame parts as an incident of being changed from the first relationship into the second relationship are blocked from changing from the second relationship back into the first relationship, wherein the support assembly comprises a holding assembly having first and second states, the holding assembly in the first state: a) allowing the first and second frame parts to be changed from the first relationship into the second relationship; and b) blocking the first and second frame parts upon being changed from the first relationship into the second relationship from being changed from the second relationship into the first relationship: the holding assembly upon being changed from the first state into the second state allowing the first and second frame parts to be changed from the second relationship back into the first relationship, wherein the support assembly comprises an actuator that is operable to change the holding assembly from the first state into the second state and the actuator is blocked by the portable article from being accessed with the portable article in the display position and directly exposed to be operated as an incident of the portable article being moved from the display position away from the support assembly.

20. In combination:

a) a first portable article having a body with a peripheral edge; and b) a support assembly for displaying the first portable article, the support assembly comprising:

a frame configured to engage the body so as to support the first portable article in a display position;

the frame comprising first and second frame parts movable one relative to the other to change a dimension of a receiving space defined by the first and second frame parts for a part of the first portable article with the first portable article in the display position, the frame configured so that: a) relative movement can be effected between the first and second frame parts between: i) a first relationship wherein the receiving space defined by the first and second frame parts has a first receiving dimension; and ii) a second relationship wherein the receiving space defined by the first and second frame parts has a second receiving dimension that is less than the first receiving dimension; and b) the first and second frame parts as an incident of being changed from the first relationship into the second relationship are blocked from changing from the second relationship back into the first relationship, wherein the first and second frame parts respectively have first and second blocking surfaces that face each other and between which the receiving space is defined, the first and second blocking surfaces each facing the peripheral edge of the first portable article with the first portable article in the display position, wherein the first and second blocking surfaces move towards and away from each other along a first line as the first and second frame parts are changed between the first and second relationships and the support assembly further comprises a third frame part movable relative to the first portable article in the display position in a first path transverse to the first line, the third frame part having a third blocking surface facing the peripheral edge of the first portable article with the first portable article in the display position, wherein the support assembly is configured so that the third frame part can be moved in one direction in the first path from a starting position into a holding position wherein the third blocking surface is moved closer to the peripheral edge of the first portable article in the display position than with the third frame part in the starting position, wherein the support assembly is configured so that as an incident of the third frame part moving from the starting position into the holding position, the third frame part is blocked from moving from the holding position back into the starting position.

21. In combination:
a) a first portable article having a body with a peripheral edge; and
b) a support assembly for displaying the first portable article, the support assembly comprising:
a frame configured to engage the body so as to support the first portable article in a display position,
the frame comprising first and second frame parts movable one relative to the other to change a dimension of a receiving space defined by the first and second frame parts for a part of the first portable article with the first portable article in the display position,
the frame configured so that: a) relative movement can be effected between the first and second frame parts between: i) a first relationship wherein the receiving space defined by the first and second frame parts has a first receiving dimension; and ii) a second relationship wherein the receiving space defined by the first and second frame parts has a second receiving dimension that is less than the first receiving dimension; and b) the first and second frame parts as an incident of being changed from the first relationship into the second relationship are blocked from changing from the second relationship back into the first relationship, wherein the support assembly comprises a holding assembly having first and second states, the holding assembly in the first state: a) allowing the first and second frame parts to be changed from the first relationship into the second relationship; and b) blocking the first and second frame parts upon being changed from the first relationship into the second relationship from being changed from the second relationship into the first relationship, the holding assembly upon being changed from the first state into the second state allowing the first and second frame parts to be changed from the second relationship back into the first relationship, wherein the holding assembly and first and second frame parts are configured to define a ratchet arrangement that with the holding assembly in the first state allows the first and second frame parts to be changed from the first relationship into the second relationship and blocks the first and second frame parts, upon being changed from the first relationship into the second relationship, from being changed from the second relationship into the first relationship, wherein the holding assembly comprises a body and there is a toothed rack and pawl cooperating relationship between the holding assembly body and each of the first and second frame parts that defines the ratchet arrangement.

* * * * *